United States Patent
Salter et al.

(10) Patent No.: US 11,203,280 B2
(45) Date of Patent: Dec. 21, 2021

(54) MAGNETIC TIE-DOWN SYSTEMS FOR SECURING CARGO WITHIN VEHICLE CARGO SPACES

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Paul Kenneth Dellock, Northville, MI (US); Mark Bosca, St. Clair Shores, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 2 days.

(21) Appl. No.: 16/561,075

(22) Filed: Sep. 5, 2019

(65) Prior Publication Data

US 2021/0070218 A1    Mar. 11, 2021

(51) Int. Cl.
| | |
|---|---|
| *B60P 7/08* | (2006.01) |
| *F21V 8/00* | (2006.01) |
| *H01F 7/20* | (2006.01) |
| *H01F 7/06* | (2006.01) |

(52) U.S. Cl.
CPC .......... *B60P 7/0892* (2013.01); *B60P 7/0807* (2013.01); *G02B 6/0005* (2013.01); *H01F 7/064* (2013.01); *H01F 7/206* (2013.01)

(58) Field of Classification Search
CPC ..... B60P 7/0807; B60P 7/0823; B60P 7/0815; B60P 3/07; B60P 3/40; B60P 7/06; B60P 7/0876; B60P 7/0892; B60P 3/20
USPC ..... 410/101, 106, 102, 116, 97, 104, 90, 84, 410/81, 77; 248/499, 500, 203, 503.1, 248/231.9, 419, 424, 429, 692; 428/131, 428/137, 138, 156, 166, 172, 167
See application file for complete search history.

(56) References Cited

U.S. PATENT DOCUMENTS

| | | | | |
|---|---|---|---|---|
| 1,638,322 | A * | 8/1927 | Chapman | H01H 71/44 335/241 |
| 5,800,106 | A * | 9/1998 | Miller | B60P 7/0807 24/303 |
| 6,213,440 | B1 * | 4/2001 | Kornback | G09F 21/042 248/514 |
| 8,167,263 | B1 | 5/2012 | Zampelli | |
| 9,221,381 | B1 | 12/2015 | Flud | |
| 9,868,382 | B2 * | 1/2018 | Aghili | B60R 11/06 |
| 10,304,429 | B1 * | 5/2019 | Broadbelt | F16M 13/02 |
| 2009/0032671 | A1 | 2/2009 | Perry et al. | |

FOREIGN PATENT DOCUMENTS

| | | |
|---|---|---|
| DE | 102007018908 A1 | 10/2008 |
| GB | 2440131 A | 1/2008 |

* cited by examiner

*Primary Examiner* — D Glenn Dayoan
*Assistant Examiner* — Sunsurraye Westbrook
(74) *Attorney, Agent, or Firm* — David Coppiellie; Carlson, Gaskey & Olds (57) ABSTRACT

This disclosure details tie-down systems for securing cargo within vehicle cargo spaces. An exemplary tie-down system may include a vehicle-mounted magnetic assembly and a tie-down that may be magnetically connected to the magnetic assembly for securing cargo within the cargo space. A magnet of the magnetic assembly may be energized to hold the tie-down and cargo in place within the cargo space or de-energized to release the tie-down and the cargo relative to the cargo space.

20 Claims, 6 Drawing Sheets

MAGNETIC TIE-DOWN SYSTEMS FOR SECURING CARGO WITHIN VEHICLE CARGO SPACES

TECHNICAL FIELD

This disclosure relates to tie-down systems for securing cargo within vehicle cargo spaces.

BACKGROUND

Vehicles typically include cargo spaces for transporting various types of cargo. Numerous accessory devices (e.g., fixed tie-downs, racks, tonneau covers, etc.) are commonly employed for facilitating use of the cargo spaces.

SUMMARY

A tie-down system according to an exemplary aspect of the present disclosure includes, among other things, a vehicle-mounted magnetic assembly including a first magnet, and a tie-down including a second magnet magnetically securable to the first magnet.

In a further non-limiting embodiment of the foregoing system, the vehicle-mounted magnetic assembly includes a housing, and the first magnet is received within the housing.

In a further non-limiting embodiment of either of the foregoing systems, the second magnet is attached to an end portion of a body of the tie-down.

In a further non-limiting embodiment of any of the foregoing systems, the body is U-shaped or horseshoe shaped.

In a further non-limiting embodiment of any of the foregoing systems, the body is covered by a covering.

In a further non-limiting embodiment of any of the foregoing systems, the system includes a cap assembly that includes a cap body and a third magnet secured to the cap body. The third magnet is removably securable to the first magnet when the tie-down is removed from the vehicle-mounted magnetic assembly.

In a further non-limiting embodiment of any of the foregoing systems, the first magnet and the second magnet together establish a residual magnetic device of the tie-down system.

In a further non-limiting embodiment of any of the foregoing systems, the system includes a printed circuit board that includes a switching device that is configured to apply either a first pulse of current for inducing a magnetic attraction between the first magnet and the second magnet or a second pulse of current for cancelling the magnetic attraction between the first magnet and the second magnet.

In a further non-limiting embodiment of any of the foregoing systems, the system includes a control module configured to receive an input signal from either a mobile device or a human machine interface. The input signal indicates whether to apply the first pulse of current or the second pulse of current.

In a further non-limiting embodiment of any of the foregoing systems, the second pulse of current includes an opposite polarity to the first pulse of current.

In a further non-limiting embodiment of any of the foregoing systems, the printed circuit board includes a light source configured to illuminate a light pipe of the tie-down.

In a further non-limiting embodiment of any of the foregoing systems, the light source is a light emitting diode.

A vehicle according to another exemplary aspect of the present disclosure includes, among other things, a cargo space that includes a panel, a magnetic assembly that includes a first magnet that is embedded within or beneath the panel, and a tie-down that includes a second magnet that is removably securable to the first magnet. In response to a first pulse of current, the first magnet and the second magnet are magnetically attracted to one another for locking the tie-down in place relative to the panel. In response to a second pulse of current, the first magnet and the second magnet are magnetically repelled from one another for unlocking the tie-down relative to the panel.

In a further non-limiting embodiment of the foregoing vehicle, the vehicle is a pickup truck and the cargo space is established by a truck bed.

In a further non-limiting embodiment of either of the foregoing vehicles, the second pulse of current includes an opposite polarity to the first pulse of current.

In a further non-limiting embodiment of any of the foregoing vehicles, the tie-down is receivable within a socket formed in the panel such that the second magnet is in abutting contact with the first magnet.

In a further non-limiting embodiment of any of the foregoing vehicles, the vehicle includes a cap assembly that includes a cap body and a third magnet secured to the cap body. The third magnet is removably securable to the first magnet when the tie-down is removed from the magnetic assembly.

In a further non-limiting embodiment of any of the foregoing vehicles, the first magnet and the second magnet together establish a residual magnetic device.

In a further non-limiting embodiment of any of the foregoing vehicles, the vehicle includes a control module configured to receive an input signal from either a mobile device or a human machine interface. The input signal indicates whether to apply the first pulse of current or the second pulse of current to the first magnet.

A method according to another exemplary aspect of the present disclosure includes, among other things, positioning a cargo item against a panel of a vehicle cargo space, positioning a tie-down of a tie-down system around the cargo item, and magnetically securing the tie-down to a magnetic assembly housed within or beneath the panel, thereby securing the cargo item in place relative to the vehicle cargo space.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details tie-down systems for securing cargo within vehicle cargo spaces. An exemplary tie-down system may include a vehicle-mounted magnetic assembly and a tie-down that may be magnetically connected to the magnetic assembly for securing cargo within the cargo space. A magnet of the magnetic assembly may be energized to hold the tie-down and cargo in place within the cargo space or de-energized to release the tie-down and the cargo relative to the cargo space. These and other features of this disclosure are described in greater detail in the following paragraphs of this detailed description.

Figure 1:
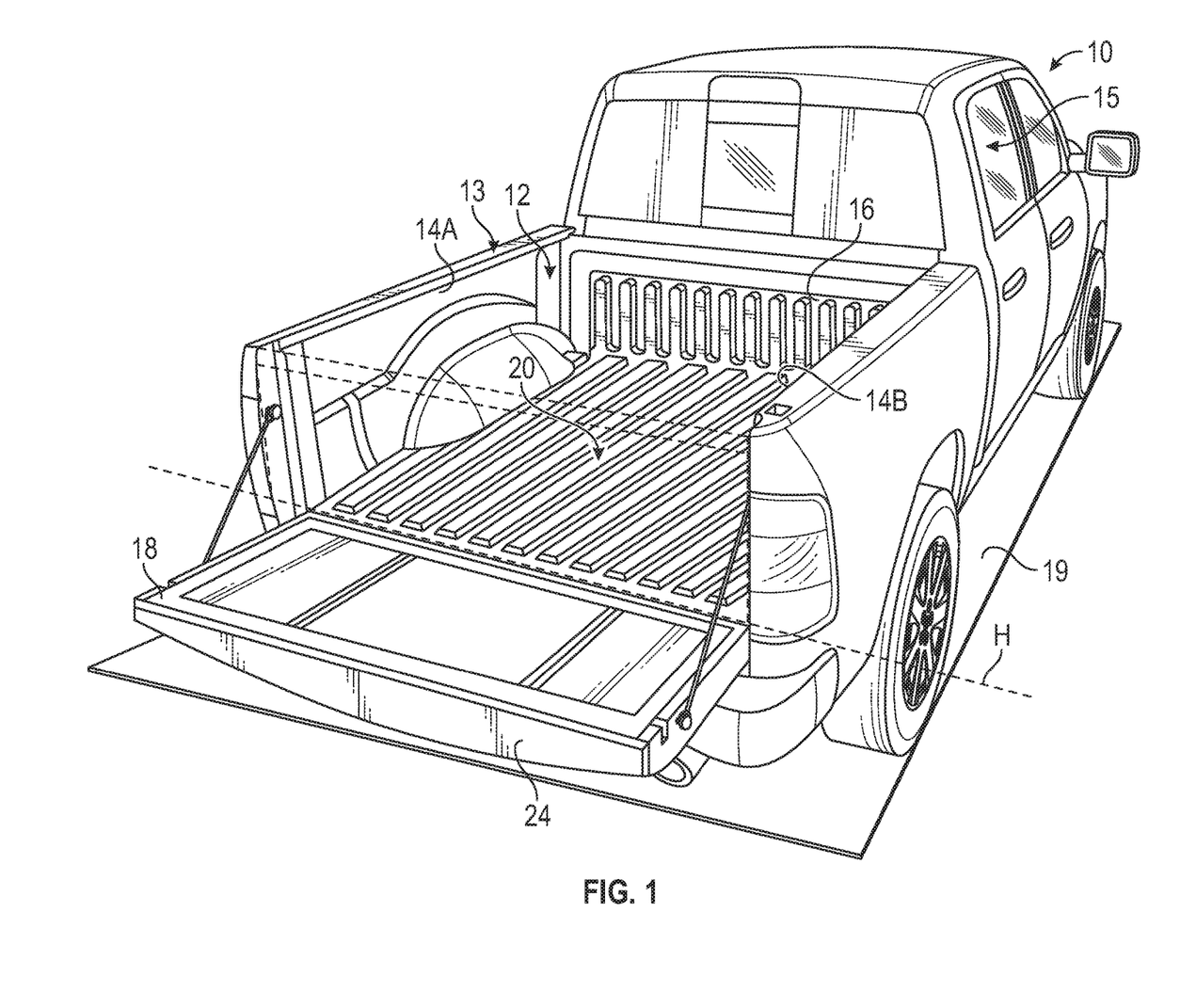
FIG. 1 illustrates a vehicle equipped with a cargo space for storing and hauling cargo.
Figure 2:
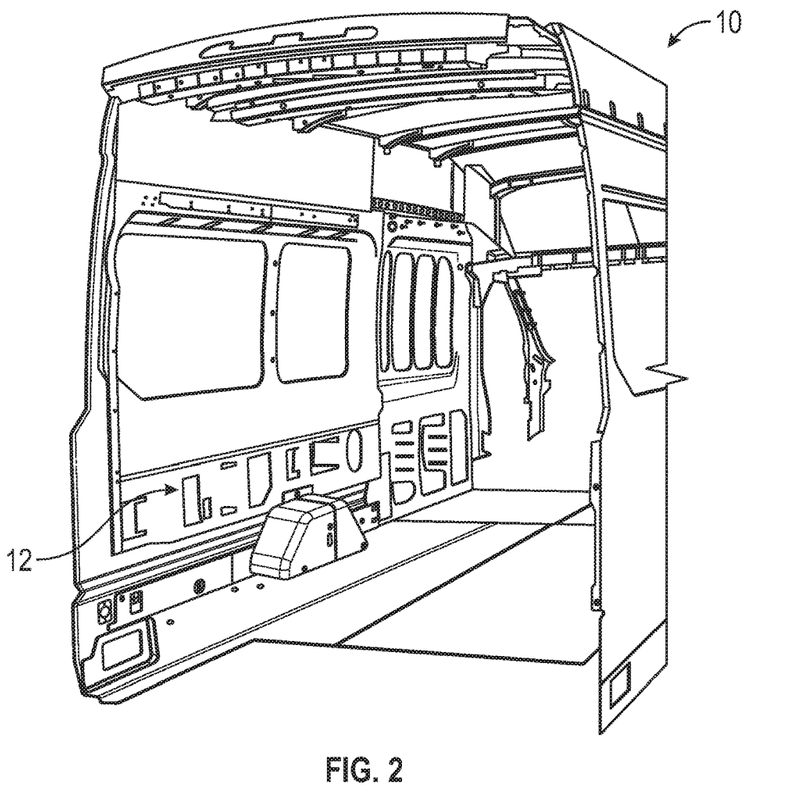
FIG. 2 illustrates another vehicle cargo space.
Figure 3:
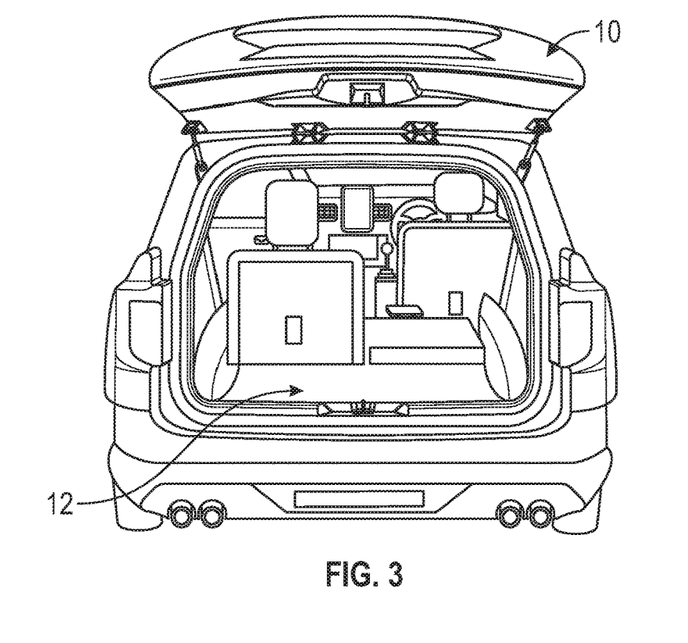
FIG. 3 illustrates yet another vehicle cargo space.

FIG. 1 illustrates a vehicle 10 that includes a cargo space 12. In the illustrated embodiment, the vehicle 10 is a pickup truck. While a pickup truck is specifically pictured and referenced herein, other vehicles could also benefit from the teachings of this disclosure. For example, the exemplary tie-down systems of this disclosure could be used to secure cargo on or within a van (see FIG. 2), a sport utility vehicle (see FIG. 3), or any other type of vehicle equipped with a cargo space.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

In the exemplary embodiment of FIG. 1, a truck bed 13 establishes the cargo space 12 for storing and hauling cargo on the vehicle 10. The cargo space 12 is generally rearward of a passenger cabin 15 of the vehicle 10 and includes a floor 20 extending between a pair of longitudinally extending side walls 14A, 14B, a laterally extending front wall 16, and a tailgate 18. The tailgate 18 is moveable between a closed position (shown in phantom) and a deployed or open position. When in the closed position, the tailgate 18 generally encloses an end of the cargo space 12 that is opposite from the front wall 16 to prevent cargo from sliding out of the cargo space 12. The tailgate 18 may be pivoted about a generally horizontal axis H to move it from the closed position to the open position and provide access to the cargo space 12. When in the open position, the tailgate 18 is generally horizontal and is parallel to a ground level 19 such that cargo can be loaded onto or unloaded from the cargo space 12.

The owner or user of the vehicle 10 may transport various types of cargo using the vehicle 10. When doing so, the user may desire flexibility for storing and securing cargo within the cargo space 12 without requiring the use of relatively complex equipment, adjustments, or two-handed processes. Vehicle tie-down systems that afford the owner/user with greater cargo storage and tie-down flexibility are therefore proposed in this disclosure.

Figure 4:
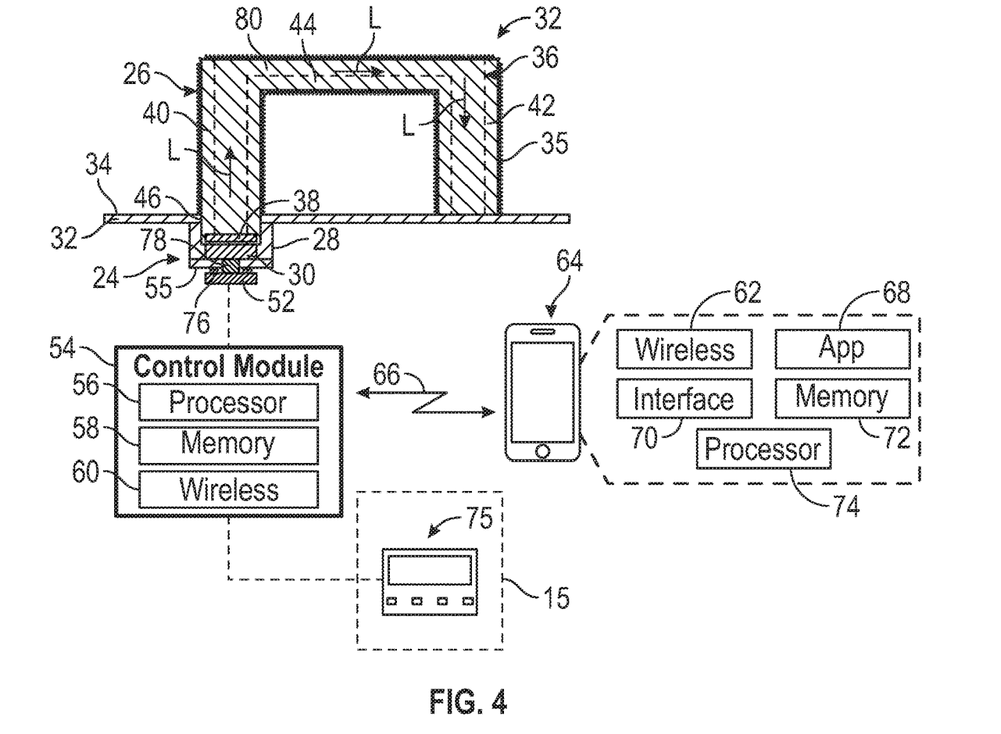
FIG. 4 illustrates a tie-down system for securing cargo within a vehicle cargo space.

FIG. 4 illustrates an exemplary tie-down system 22 for securing cargo within a cargo space, such as the cargo space 12 of the vehicle of FIG. 1. The tie-down system 22 may include a vehicle-mounted magnetic assembly 24 (hereinafter referred to simply as "magnetic assembly") and a tie-down 26 that is removably securable to the magnetic assembly 24 for securing cargo within the cargo space 12. Although only a single magnetic assembly and a single tie-down are shown in FIG. 4, the total number of magnetic assemblies and tie-downs utilized by the tie-down system 22 may vary depending on the size and shape of the cargo space and the cargo to be carried and is therefore not intended to limit this disclosure.

The magnetic assembly 24 may include a housing 28 and a magnet 30 housed within the housing 28. The housing 28 may be embedded within or otherwise secured to a panel 32 of the cargo space 12. In an embodiment, the housing 28 is positioned relative to the panel 32 such that the magnet 30 is countersunk below an exterior surface 34 of the panel 32. The housing 28 may be secured to the panel 32 using any fastening technique, including but not limited to, welding or mechanical fastening techniques.

The panel 32 may be part of a floor, a side wall, a roof, or any other surface that establishes the cargo space 12. In an embodiment, the panel 32 is part of a load bearing surface of the cargo space 12. The panel 32 may be made of any type of materials, including but not limited to, steel, aluminum, carbon fiber, polymers, etc.

The tie-down 26 may include a body 36 and a magnet 38 attached to the body 36. The body 36 of the tie-down 26 may be constructed of any high strength metallic or polymeric materials, or a combination of such materials. In an embodiment, the body 36 embodies an upside-down U-shape when the tie-down 26 is secured relative to the magnetic assembly 24. In another embodiment, the body 36 embodies a horseshoe shape. However, the size and shape of the body 36 of the tie-down 26 is in no way intended to limit this disclosure.

The body 36 may optionally be covered or encapsulated within a covering 35. The covering 35 may be carpet, plastic, or any other relatively soft material for preventing damage to the cargo that is held down by the tie-down 26.

The body 36 may include a first body section 40, a second body section 42 that extends generally in parallel with the first body section 40, and a third body section 44 that connects between the first body section 40 and the second body section 42. The third body section 44 may be a cross member that extends between ends of the first body section 40 and the second body section 42. The third body section 44 may therefore establish a handle portion that can be gripped by a user in order to maneuver and position the tie-down 26 relative to the magnetic assembly 24.

The magnet 38 of the tie-down 26 may be secured to either the first body section 40 or the second body section 42 at an end opposite from the third body section 44. As is further discussed below, the magnet 38 may be magnetically connected to the magnet 30 of the magnetic assembly 24 for securing cargo within the cargo space.

The first body section 40 of the tie-down 26 may be received into a socket 46 formed in the panel 32 in order to position the magnet 38 into abutting contact with the magnet 30. Therefore, at least a portion of the first body section 40 (or the second body section 42) may extend below the exterior surface 34 of the panel 32, thereby increasing the shear strength of the tie-down 26 when it is secured to the magnetic assembly 24.

Together, the magnet 30 of the magnetic assembly 24 and the magnet 38 of the tie-down 26 may establish a residual magnetic device of the tie-down system 22. By using residual magnetism, the tie-down system 22 can be energized to lock the magnet 38 relative to the magnet 30, thereby securing the tie-down 26 (and any desired cargo) relative to the panel 32. Alternatively, the tie-down system 22 can be de-energized to unlock the magnet 38 relative to the magnet 30, thereby allowing the tie-down 26 to be moved away from the panel 32 for releasing any cargo that was secured by the tie-down 26. Other than the single pulse of current that is required to energize the tie-down system 22, no power is required to hold the magnet 38 to the magnet 30. Therefore, the tie-downs 26 can be securely held in place without using any significant amount of the vehicle's power.

Figures 5A, 5B:
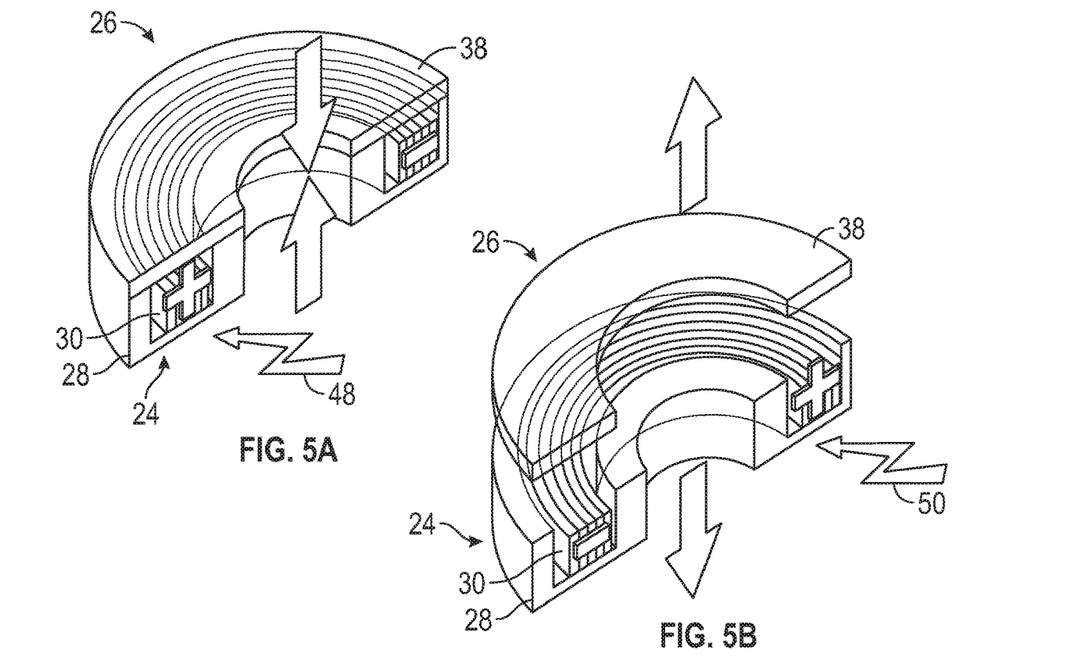
FIGS. 5A and 5B schematically illustrate the energizing and de-energizing, respectively, of the tie-down system of FIG. 4.

FIGS. 5A and 5B schematically illustrate the energization and de-energization, respectively, of the tie-down system 22. Referring first to FIG. 5A, a first pulse of current 48 may be applied to the magnet 30 of the magnetic assembly 24 in order to induce a magnetic attraction between the magnet 30 and the magnet 38 when the tie-down 26 is positioned proximate to the magnetic assembly 24. Furthermore, as shown in FIG. 5B, a second pulse of current 50 that includes a reverse polarity compared to the first pulse of current 48 may be subsequently applied to the magnet 30 in order to cancel the magnetic attraction between the magnet 30 and the magnet 38. Therefore, the tie-down 26 can be held in place against the panel 32 for an indefinite amount of time from a single pulse of current (i.e., the first pulse of current 48).

Referring again primarily to FIG. 4, the magnetic assembly 24 (and/or any other portion of the tie-down system 22) may be equipped with a printed circuit board (PCB) 52. In an embodiment, the PCB 52 is mounted at a rear surface 55 of the housing 28 of the magnetic assembly 24.

The PCB 52 may be in electrical communication with a control module 54 for controlling the energization and de-energization of the tie-down system 22. The control module 54 may be part of an overall vehicle control system or could be a separate control system that communicates with the vehicle control system. The control module 54 may be equipped with the necessary hardware and software for interfacing with and commanding operation of the various components of the tie-down system 22. In an embodiment, the control module 54 includes a processing unit 56 and non-transitory memory 58 for executing the various control strategies and operations of the tie-down system 22.

The control module 54 may additionally include a wireless device 60 for communicating with another wireless device 62 of a mobile device 64, which in most implementations will belong to the owner/user of the vehicle 10. In an embodiment, the wireless devices 60, 62 are Bluetooth Low Energy (BLE) transceivers that are configured to communicate with one another over a wireless connection 66. The wireless connection 66 may be a BLE connection, a Wi-Fi connection, or any other type of wireless connection.

The mobile device 64 (e.g., smart phone, tablet, computer, etc.) may include an application 68 that includes programming to allow the user to use a user interface 70 (see FIG. 6) to control the energization and de-energization of the tie-down system 22. The application 68 may be stored in memory 72 of the mobile device 64 and may be executed by a processor 74 of the mobile device 64.

The user may wish to induce the magnetic attraction between the magnet 30 and the magnet 38 when attempting to secure cargo via the tie-down system 22, or the user may wish to cancel the magnetic attraction between the magnets 30, 38 when attempting to remove the cargo from the cargo space 12. In an embodiment, the user of the vehicle 10 may use the application 68 of the mobile device 64 to either induce or cancel the magnetic attraction between the magnet 30 and the magnet 38. In another embodiment, the user of the vehicle 10 may use a human machine interface 75 located within the passenger cabin 15 of the vehicle 10 to either induce or cancel the magnetic attraction between the magnet 30 and the magnet 38.

The energization/de-energization commands received from either the mobile device 64 or the human machine interface 75 may be received as input signals by the control module 54. The control module 54 may then command the PCB 52 to either communicate the first pulse of current 48 (i.e., for locking the tie-down 26 in place) or the second pulse of current 50 (i.e., for unlocking the tie-down 26) to the magnet 30 based on these input signals.

In an embodiment, the PCB 52 includes one or more switching devices 76 (shown highly schematically) for controlling whether either the first pulse of current 48 or the second pulse of current 50 is applied to the magnet 30. The switching device 76 may be a MOSFET device or any other kind of transistor, for example.

One or more light sources 78 could optionally be mounted to the PCB 52. In an embodiment, the light source 78 is a light emitting diode (LED). In another embodiment, the light source 78 is a multi-colored LED, such as a Red, Green, Blue (RGB) LED, for example. Other light sources could also be utilized within the scope of this disclosure.

The light source 78 can be controlled to emit light in response to a command from the control module 54. The light source 78 may provide added security and aesthetically pleasing features to the tie-down system 22 and can help the user locate the tie-down 26 during nighttime or other low lighting situations. In an embodiment, the light emitted by the light source 78 is spread throughout the body 36 of the tie-down 26 via a light pipe 80 that is housed inside one or more of the body sections 40, 42, and 44 of the body 36. In another embodiment, the light source 78 can emit a first color when the magnet 30 is energized and can emit a second, different color when the magnet 30 is de-energized.

Figure 6:
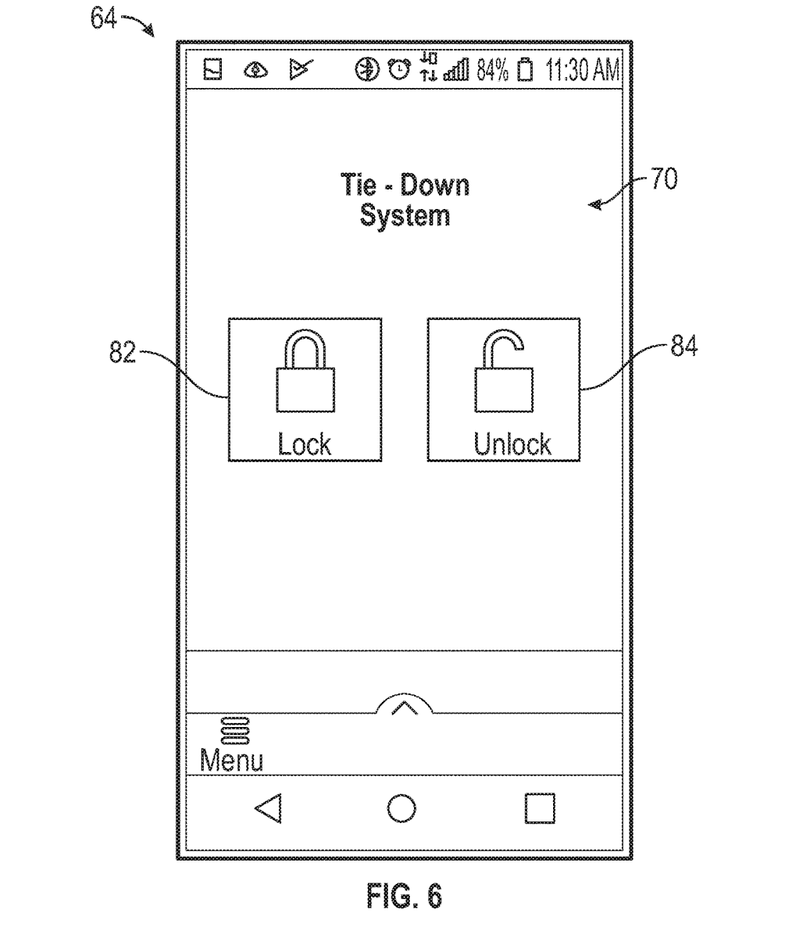
FIG. 6 illustrates an exemplary user interface of a mobile device for remotely controlling the tie-down system of FIG. 4.

FIG. 6 illustrates an exemplary user interface 70 of the application 68 of the mobile device 64 shown in FIG. 4. The user interface 70 may include a lock button 82 and an unlock button 84. The lock button 82 may be pressed or otherwise actuated by the user to induce the magnetic attraction between the magnet 30 and the magnet 38, thereby locking the tie-down 26 and the cargo held down by the tie-down 26 securely in place within the cargo space 12. The unlock button 84 may be pressed or otherwise actuated by the user to cancel the magnetic attraction between the magnet 30 and the magnet 38, thereby unlocking the tie-down 26 from the panel 32 and releasing the cargo relative to the cargo space 12.

The user interface 70 shown in FIG. 6 is but one non-limiting example of how the user interface 70 could be presented to the user. Other configurations are also contemplated within the scope of this disclosure.

Figure 7A:
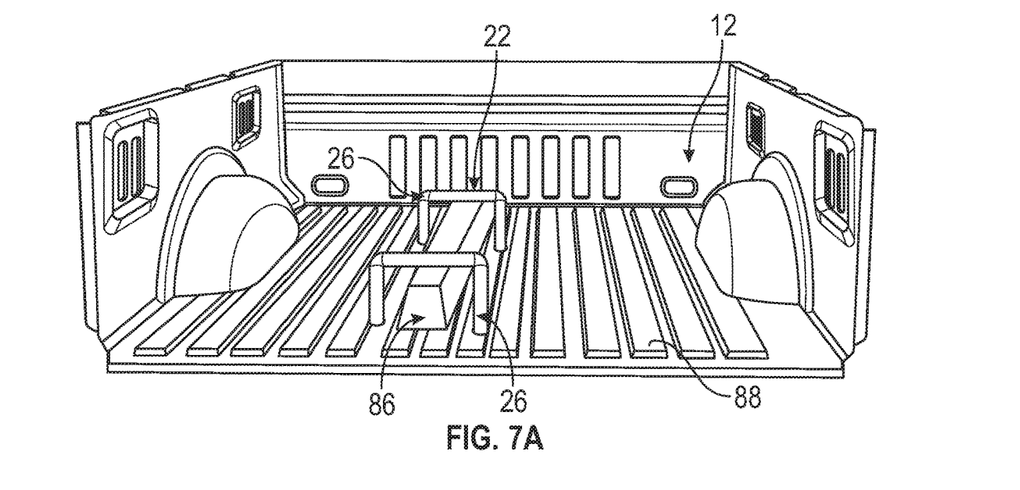
FIGS. 7A, 7B, and 7C schematically illustrate exemplary uses of vehicle cargo space tie-down systems.
Figure 7B:
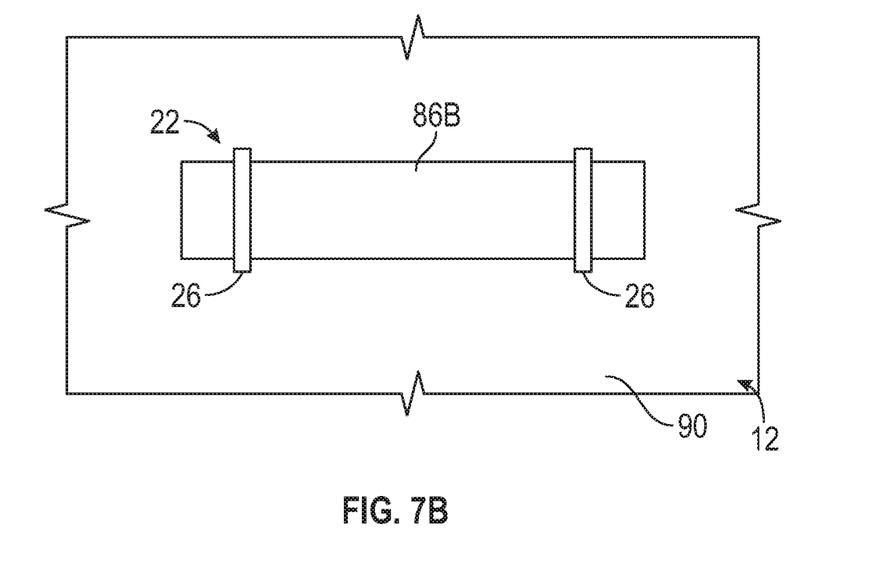
Figure 7C:
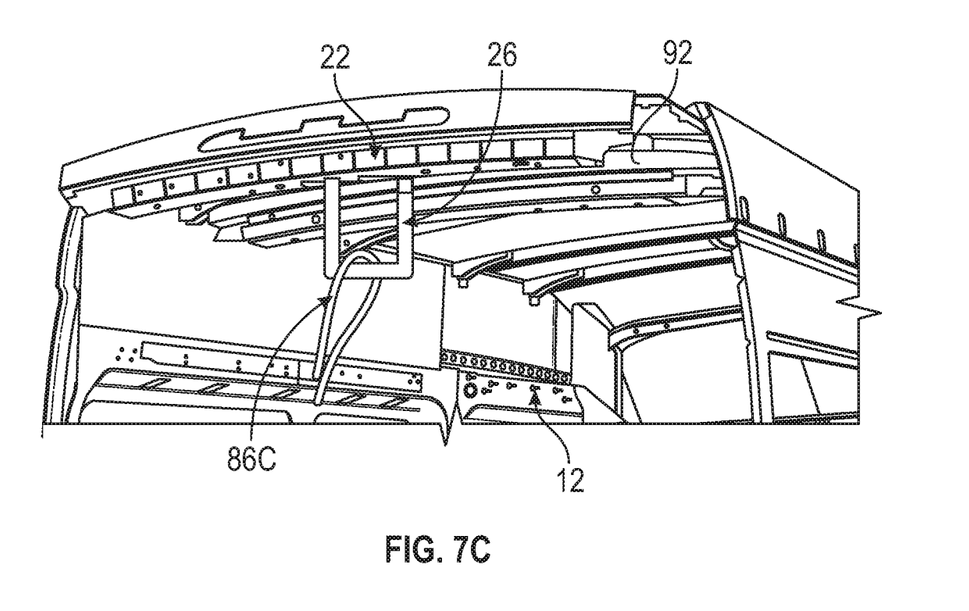

Referring now to FIGS. 7A, 7B, and 7C, the tie-down system 22 described above may be used to secure one or more cargo items 86 within the cargo space 12. The cargo item(s) 86 could be any cargo (e.g., long stock (e.g., lumber), boxes, lawn tools, etc.) that the owner of the vehicle 10 desires to haul within the cargo space 12.

Referring first to FIG. 7A, a cargo item 86A is shown secured relative to a floor 88 of a cargo space 12 using a set to two tie-downs 26 (and two magnetic assemblies, although not shown in FIG. 7A for the sake of simplicity).

Referring to FIG. 7B, another cargo item 86B is shown secured relative to a side wall 90 of a cargo space 12 using a set of two tie-downs 26 (and two magnetic assemblies, although not shown in FIG. 7B for the sake of simplicity).

Referring to FIG. 7C, yet another cargo item 86C is shown secured relative to a roof 92 of a cargo space 12 using a single tie-down 26 (and one magnetic assembly, although not shown in FIG. 7C for the sake of simplicity).

It should be understood that any number and orientation of tie-downs and magnetic assemblies of the tie-down system 22 may be employed for holding down cargo items within the vehicle cargo spaces. The exact positionings of the tie-downs and magnetic assemblies can be customized to accommodate the width and length of any cargo item.

Figure 8:
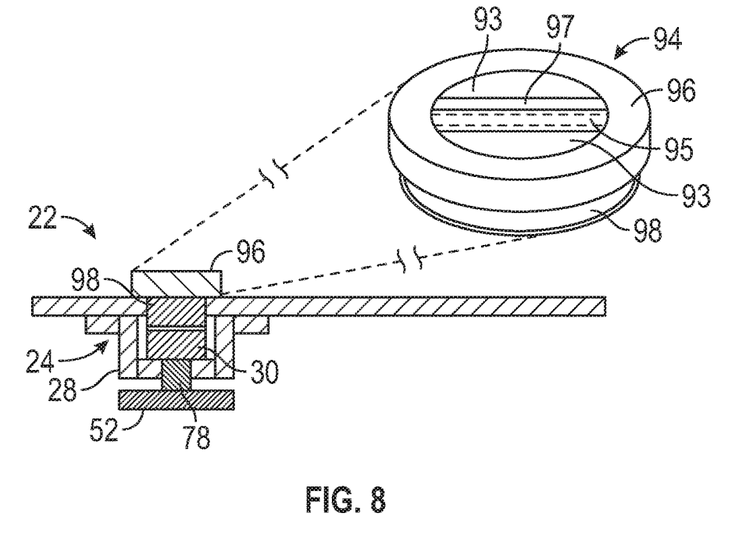
FIG. 8 illustrates a cap assembly of a tie-down system.

FIG. 8 illustrates a cap assembly 94 of the tie-down system 22 of FIG. 4. When not in use for securing cargo, the cap assembly 94 can be employed in order to protect the magnetic assembly 24. The cap assembly 94 may include a cap body 96 and a magnet 98. The magnet 98 may be removably secured to the magnet 30 of the magnetic assembly 24. This may be achieved by energizing the magnet 30 in the same manner described above. In another embodiment, the cap body 96 is screwed into the socket 46 for covering the magnetic assembly 24.

The cap body 96 may include a handle 91 that is flanked by finger depressions 93 for easily gripping the handle 91. The handle 91 may optionally include a light pipe 95 for illuminating the cap body 96 via the light source 78 of the PCB 52.

Figure 9:
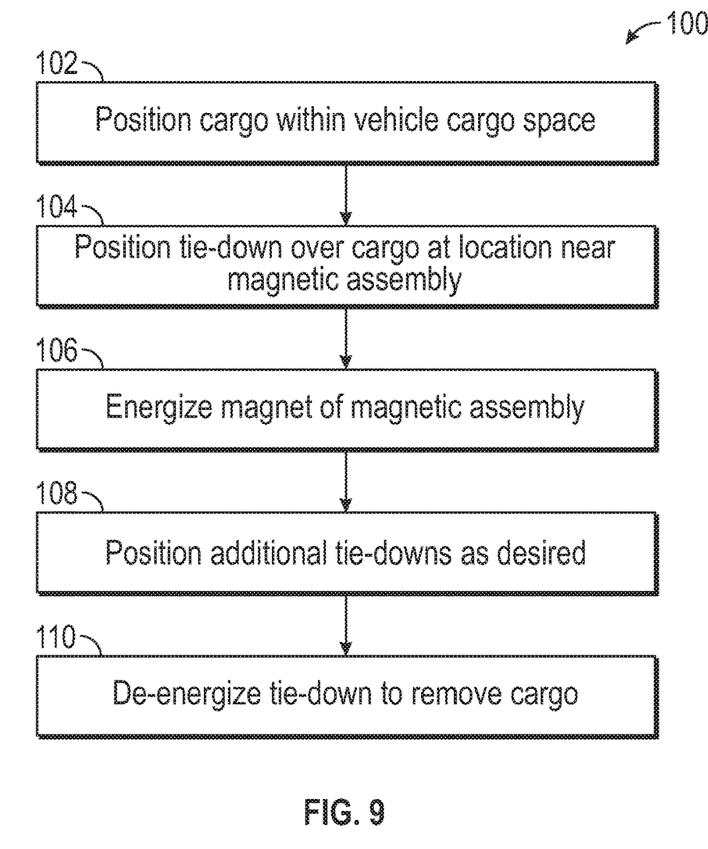
FIG. 9 schematically illustrates a method of using a tie-down system for securing cargo within a vehicle cargo space.

FIG. 9, with continued reference to FIGS. 1-8, schematically illustrate an exemplary method 100 for securing cargo within a vehicle cargo space using the tie-down system 22. One or more of the tie-downs 26 and the magnetic assemblies 24 may be utilized during the method 100.

First, at block 102 of the method 100, a cargo item 86 may be positioned against a panel 32 located within the cargo space 12. The cargo item 86 may include any size or shape.

Next, at block 104, one tie-down 26 of the tie-down system 22 is positioned over the cargo item 86 at a location that is proximate to one of the magnetic assemblies 24. For example, the tie-down 26 may be positioned around the cargo item 86 and the magnet 38 may be inserted into the socket 46 of the panel 32 until the magnet 38 abuts against the magnet 30.

At block 106, the magnet 30 may be energized to induce magnetic attraction between the magnet 30 and the magnet 38, thereby securing the tie-down 26 in place. Additional tie-downs 26 may optionally be positioned around the cargo item 86 and be locked in place at block 108 depending on the size and shape of the cargo item 86.

At block 110, which may occur at any time after performing the preceding steps, the tie-down(s) 26 may be de-energized to cancel the magnetic attraction between the magnet(s) 30 and the magnet(s) 38. Finally, at block 112, The tie-down(s) 26 may then be removed, thereby allowing the cargo item 86 to be repositioned or removed from the cargo space 12.

The tie-down systems of this disclosure provide users with the ability to simply and efficiently secure cargo within vehicle cargo spaces. Tie-downs and magnetic assemblies of the tie-down systems may be positioned in various orientations, including customized orientations, within vehicle cargo spaces for holding cargo items in place without the need for relatively complex and expensive equipment of known cargo management systems. The tie-downs systems of this disclosure further provide for a relatively simple place-and-lock installation procedure that is simpler and less time consuming as compared to known cargo management solutions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tie-down system, comprising:
   a vehicle-mounted magnetic assembly including a first magnet;
   a tie-down including a second magnet magnetically securable to the first magnet; and
   a light source arranged to illuminate a portion of the tie-down.

2. The system as recited in claim 1, wherein the vehicle-mounted magnetic assembly includes a housing, and the first magnet is received within the housing.

3. The system as recited in claim 1, wherein the second magnet is attached to an end portion of a body of the tie-down.

4. The system as recited in claim 3, wherein the body is U-shaped or horseshoe shaped.

5. The system as recited in claim 3, wherein the body is covered by a covering.

6. The system as recited in claim 1, comprising a cap assembly that includes a cap body and a third magnet secured to the cap body, wherein the third magnet is removably securable to the first magnet when the tie-down is removed from the vehicle-mounted magnetic assembly.

7. The system as recited in claim 1, wherein the first magnet and the second magnet together establish a residual magnetic device of the tie-down system.

8. The system as recited in claim 1, comprising a printed circuit board that includes a switching device that is configured to apply either a first pulse of current for inducing a magnetic attraction between the first magnet and the second magnet or a second pulse of current for cancelling the magnetic attraction between the first magnet and the second magnet.

9. The system as recited in claim 8, comprising a control module configured to receive an input signal from either a mobile device or a human machine interface, the input signal indicating whether to apply the first pulse of current or the second pulse of current.

10. The system as recited in claim 8, wherein the second pulse of current includes an opposite polarity to the first pulse of current.

11. The system as recited in claim 8, wherein the printed circuit board includes the light source, and the light source is configured to illuminate a light pipe of the tie-down.

12. The system as recited in claim 11, wherein the light source is a light emitting diode.

13. A vehicle, comprising:
a cargo space that includes a panel;
a magnetic assembly that includes a first magnet that is embedded within or beneath the panel;
a tie-down that includes a second magnet that is removably securable to the first magnet,
wherein, in response to a first pulse of current, the first magnet and the second magnet are magnetically attracted to one another for locking the tie-down in place relative to the panel,
wherein, in response to a second pulse of current, the first magnet and the second magnet are magnetically repelled from one another for unlocking the tie-down relative to the panel.

14. The vehicle as recited in claim 13, wherein the second pulse of current includes an opposite polarity to the first pulse of current.

15. The vehicle as recited in claim 13, wherein the tie-down is receivable within a socket formed in the panel such that the second magnet is in abutting contact with the first magnet.

16. The vehicle as recited in claim 13, comprising a cap assembly that includes a cap body and a third magnet secured to the cap body, wherein the third magnet is removably securable to the first magnet when the tie-down is removed from the magnetic assembly.

17. The vehicle as recited in claim 13, wherein the first magnet and the second magnet together establish a residual magnetic device, and comprising a control module configured to receive an input signal from either a mobile device or a human machine interface, the input signal indicating whether to apply the first pulse of current or the second pulse of current to the first magnet.

18. A method, comprising:
positioning a cargo item against a panel of a vehicle cargo space;
positioning a tie-down of a tie-down system around the cargo item; and
magnetically securing the tie-down to a magnetic assembly housed within or beneath the panel, thereby securing the cargo item in place relative to the vehicle cargo space.

19. The system as recited in claim 1, wherein the second magnet is mounted directly to a unitary body of the tie-down.

20. The method as recited in claim 18, comprising:
illuminating a portion of the tie-down after magnetically securing the tie-down to the magnetic assembly.

* * * * *